(No Model.)

A. S. KISSELL.
DUST PROOF THERMOSTAT.

No. 380,394. Patented Apr. 3, 1888.

Witnesses.
Wm. Rheem.
W. W. Elliott.

Inventor.
A. S. Kissell.
By Jno. G. Elliott.
Atty.

UNITED STATES PATENT OFFICE.

ABRAHAM S. KISSELL, OF CHICAGO, ILLINOIS.

DUST-PROOF THERMOSTAT.

SPECIFICATION forming part of Letters Patent No. 380,394, dated April 3, 1888.

Application filed September 14, 1887. Serial No. 249,611. (No model.)

*To all whom it may concern:*

Be it known that I, ABRAHAM S. KISSELL, a citizen of the United States, residing at Chicago, county of Cook, and State of Illinois, have invented certain new and useful Improvements in Dust-Proof Thermostats, of which the following is a specification.

This invention relates to improvements in thermostats, and more particularly to that class in which a thermostatic bar composed commonly of metal and gutta-percha strips united together is employed for making and breaking an electric circuit through a contact-point with which it comes in contact by reason of the unequal expansion of the materials composing the bar, thereby producing a lateral flexure of the free end of said bar.

The prime object of this invention is to exclude from the free end of such bar, and also the contact point or points, dust, lint, or any other foreign substances tending to decrease the sensitiveness of the instrument.

Another object is to inclose the contact point or points in a compartment into which the end of the thermostatic bar projects through an enlarged opening, so that it may have a free lateral flexure or bend in order to engage the contact-point, and to provide a cap or cover for such opening moving with the thermostatic bar, but at all times protecting or covering the said opening, regardless of the position of the thermostatic bar, whereby the contact-points and the bar will be effectually protected without in the slightest degree impairing the sensitiveness of the instrument.

I attain these objects by devices illustrated in the accompanying drawings, in which—

Figure 1:
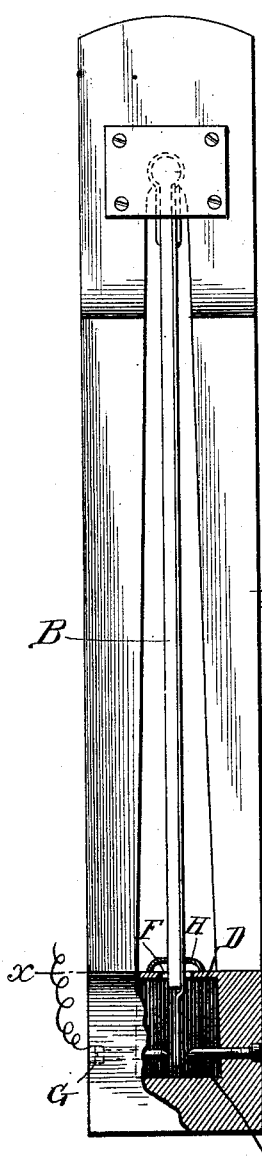
Figure 5:
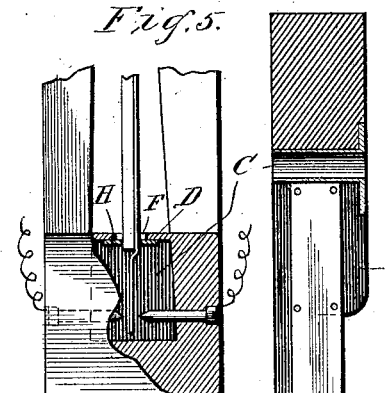
Figure 2:
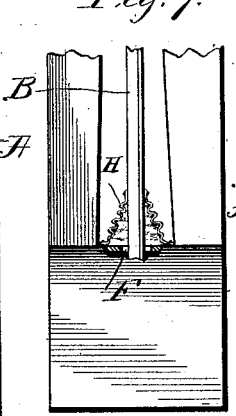
Figure 6:
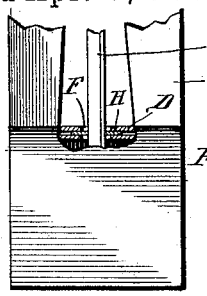
Figure 4:
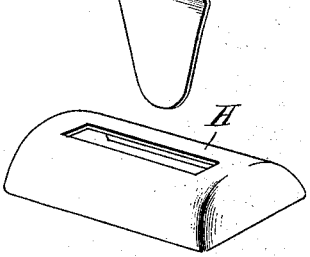
Figure 7:
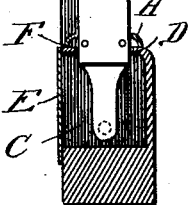
Figure 3:
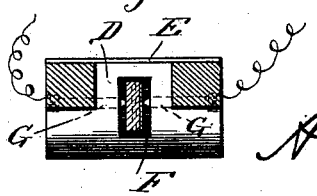

Figure 1 represents an elevation of a thermostat embodying my invention; Fig. 2, a central longitudinal section thereof; Fig. 3, a transverse horizontal section on line *x x*, Fig. 1; Fig. 4, detail perspectives of the thermostatic bar and the preferred form of movable cover slightly separated; Fig. 5, a detail view showing the cover moving within the recess or closed compartment; Figs. 6 and 7, detail views of modified forms of the movable cover; and Fig. 8, a detail perspective of a detachable hood constituting two walls of the closed compartment, designed for use in connection with thermostats in which no closed compartment is provided in the frame as orginally constructed.

Similar letters of reference indicate the same parts in the several figures of the drawings.

Referring by letter to the accompanying drawings, A indicates the frame of my thermostat, preferably composed of wood, and having a contour common to devices of this class, in that it is provided with an elongated slot extending longitudinally and centrally thereof, in which is located the thermostatic bar B, secured at its upper end in any well-known and convenient manner, in order that the lower end of said bar may be free to have a lateral flexure or bend whenever the unequal expansion of the materials which usually compose such a bar induces such bending as a result of variations in the temperature to which the bar is exposed.

In the lower end of the frame A is formed a compartment or recess, C, preferably by mortising into said frame from one face thereof, so as to leave only a thin wall, D, at the top and on one face thereof, the side of said recess from which the mortise is made being closed by a strip of paper, E, pasted at its edges to the frame or in any other convenient manner, so as to convert the recess into a closed compartment. Through the thin top or roof of such compartment is cut a slot, F, through which projects the free end of the thermostatic bar, which latter reaches nearly to the bottom of the recess, where its end hangs suspended between the contact-points G G, also projecting into said compartment, but laterally from the side walls thereof, the said points in this case consisting of screws working through the frame A.

The slot F is of course of sufficient width to permit of a lateral movement therein of the thermostatic bar, so as to engage the said contact-points; and in order to prevent the entrance through said slot of dust, lint, and other foreign substances which might lodge upon the contact-points or thermostatic bar and materially interfere with the sensitiveness and delicacy of adjustment of the instrument I provide a slidable or movable cover, H, for said opening, through which the thermostatic bar passes, and which rests and slides back and forth upon the roof of the closed compartment, moving with but in no manner obstructing or interfering with the said bar. This cap or covering fits snugly around the thermostatic bar and is somewhat larger than the slot F, through which said bar projects into the closed compartment, in order that the bar may move to either extreme without uncovering the said slot, and it is obvious that a movable cover so constructed and arranged offers little or no resistance to the lateral flexure of the thermostatic bar.

The movable cap or cover may be composed of any suitable material, either of paper, wood, gutta-percha, glass, or metal, glass, however, being preferred, because of its cheapness and minimum amount of friction, and the shape of the cover is equally immaterial, so long as it serves the purpose for which it is intended.

In Fig. 5 I have shown the cover beneath the roof and within the closed compartment, and in Fig. 6 the cover is shown as working in grooves formed in the said roof and opening into the slot therein; but in both of these cases what amounts to a cup is formed, in which cup dust will settle and eventually work into the closed compartment unless occasionally removed, and in both of these forms of movable covers more friction is encountered than in the preferred construction.

In Fig. 7 I have shown another form of movable cover, consisting of flexible material—such as silk, sheet-rubber, and the like—attached, by pasting or otherwise, to the thermostatic bar and the roof of the compartment surrounding the slotted opening therein, leaving sufficient fullness to permit of the free lateral flexure of the thermostatic bar; but I may here state that, so far as this cover is concerned, it is immaterial whether it be flexible or rigid so long as it moves with the thermostatic bar and covers the slotted opening through which said bar works at all times, regardless of the position of the bar in the slot.

Figure 8:
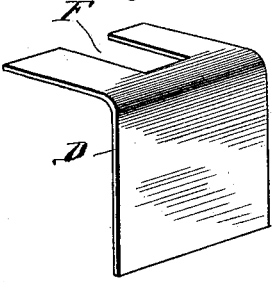

In order to employ my invention with thermostats already manufactured, but not provided with a mortised compartment, I have provided the supplemental and separate hood shown in Fig. 8, which constitutes two or more walls of the closed compartment, according to the structure of the thermostatic frame, which hood is also provided with a slotted opening for the entrance of the thermostatic bar, the usual movable cover of course being employed in connection with the hood.

Having described my invention, what I claim, and desire to secure by Letters Patent, is—

1. In a thermostat, a compartment provided with a single opening, and the thermostatic bar projecting through said opening, and contact-points projecting into said compartment, in combination with a cover moving with said bar, but at all times completely closing said opening, substantially as described.

2. In a thermostat, a closed compartment provided with a single opening, the thermostatic bar passing freely through said opening, and contact-points projecting into said compartment, in combination with a slidable cover for said opening attached to and movable with the thermostatic bar, said cover being sufficiently large to close said opening at all times during the movement of said bar, substantially as described.

3. In a thermostat, a compartment provided with a single opening in the roof thereof, contact-points projecting in said chamber, and a cover for said opening sliding upon said roof and larger than the opening therein, in combination with the thermostatic bar passing snugly through said cover, but loosely through said opening, whereby said bar may have a lateral flexure and carry with it said slidable cover, substantially as described.

ABRAHAM S. KISSELL.

Witnesses:
JNO. G. ELLIOTT,
W. W. ELLIOTT.